(12) United States Patent
Johansson et al.

(10) Patent No.: US 11,355,911 B2
(45) Date of Patent: Jun. 7, 2022

(54) POWER SUPPLY CIRCUIT FOR A BREAKING CIRCUIT

(71) Applicant: Blixt Tech AB, Stockholm (SE)

(72) Inventors: Jan Johansson, Solna (SE); Henrik Borg, Norsborg (SE)

(73) Assignee: Blixt Tech AB, Stockholm (SE)

( * ) Notice: Subject to any disclaimer, the term of this patent is extended or adjusted under 35 U.S.C. 154(b) by 235 days.

(21) Appl. No.: 16/479,066

(22) PCT Filed: Dec. 22, 2017

(86) PCT No.: PCT/SE2017/051343
§ 371 (c)(1),
(2) Date: Jul. 18, 2019

(87) PCT Pub. No.: WO2018/135987
PCT Pub. Date: Jul. 26, 2018

(65) Prior Publication Data
US 2021/0288485 A1    Sep. 16, 2021

(30) Foreign Application Priority Data

Jan. 19, 2017  (WO) ................. PCT/SE2017/050046
Apr. 6, 2017  (SE) ..................................... 1750420-0

(51) Int. Cl.
*H02H 1/06*    (2006.01)
(52) U.S. Cl.
CPC ..................... *H02H 1/06* (2013.01)
(58) Field of Classification Search
CPC . H02H 1/06; H02H 3/08–105; H02M 1/0006; H02M 7/02; H02M 7/05;
(Continued)

(56) References Cited

U.S. PATENT DOCUMENTS

| 5,629,607 A | 5/1997 | Callahan et al. |
| 5,831,349 A | 11/1998 | Weng |

(Continued)

*Primary Examiner* — Fred E Finch, III
(74) *Attorney, Agent, or Firm* — Blank Rome LLP

(57) ABSTRACT

The present invention relates to a power supply circuit (400) for a breaking circuit (100), the power supply circuit (400) comprising a first connecting point (CP1) arranged to be connected to an input (102) of the breaking circuit (100) and a second connecting point (CP2) arranged to be connected to an output (104) of the breaking circuit (100). The power supply circuit (400) further comprises a first rectifier (416) and a second rectifier (418) connected in series and in opposite direction to each other between the first connecting point (CP1) and the second connecting point (CP2); a first switch (412) and a second switch (414) connected in series between the first connecting point (CP1) and the second connecting point (CP2), wherein the first switch (412) and the second switch (414) are connected in parallel to the first rectifier (416) and the second rectifier (418); and a first capacitor (C1) having a first connecting point ($CP1_{C1}$) connected between the first rectifier (416) and the second rectifier (418) and a second connecting point ($CP2_{C1}$) connected between the first switch (412) and the second switch (414), wherein the first connecting point ($CP1_{C1}$) of the first capacitor (C1) is further arranged to be connected to a power consumer (110a, 110b, . . . , 110n) of the breaking circuit (100). The power supply circuit (400) is arranged to at least one of: open the first switch (412) so that a current running from the input (102) to the output (104) passes via the first rectifier (416), the first capacitor (C1) and the second switch (414) thereby charging the first capacitor (C1); and open the second switch (414) so that a current running from the output (104) to the input (102) passes via the second rectifier (418), the first capacitor (C1) and the first switch (412) thereby charging the first capacitor (C1).

13 Claims, 12 Drawing Sheets

(58) Field of Classification Search
CPC ........ H02M 7/06; H02M 7/064; H02M 7/066; H02M 7/08
See application file for complete search history.

(56) References Cited

U.S. PATENT DOCUMENTS

| | | | |
|---|---|---|---|
| 9,155,162 B2* | 10/2015 | Zotter | H05B 39/08 |
| 9,961,749 B1* | 5/2018 | Lee | H01L 29/866 |
| 2003/0160517 A1 | 8/2003 | Lo et al. | |
| 2006/0255746 A1 | 11/2006 | Kumar et al. | |
| 2010/0270982 A1 | 10/2010 | Hausman, Jr. et al. | |
| 2014/0126261 A1* | 5/2014 | Newman, Jr. | H05B 39/044 |
| | | | 363/128 |
| 2018/0278039 A1* | 9/2018 | Reddy Kambham | G05F 5/00 |
| 2019/0044318 A1* | 2/2019 | Johansson | H02H 3/20 |
| 2019/0109454 A1* | 4/2019 | Neyman | H02M 1/08 |
| 2019/0372459 A1* | 12/2019 | Boesche | H02M 3/07 |
| 2020/0028359 A1* | 1/2020 | Garbi | H03K 17/08148 |

\* cited by examiner

POWER SUPPLY CIRCUIT FOR A BREAKING CIRCUIT

TECHNICAL FIELD

The present invention relates to a power supply circuit for a breaking circuit.

BACKGROUND

Circuits for breaking alternating current (AC) are known in the art.

One known solution is the well-known fuse, which breaks the current if an applied current is larger than a nominal value, i.e. an overcurrent, during a time period. The applied current is broken as a metal wire or strip of the fuse melts due to the overcurrent.

Another solution known in the art is a circuit breaker which is arranged to protect electrical circuits, including electrical loads, from damages caused by overcurrent. Unlike the fuse solution, the known circuit breaker may be reset manually or automatically to resume normal operation.

SUMMARY

An objective of embodiments of the present invention is to provide a solution which at least partly mitigates or solves at least some of the drawbacks and problems of the known solutions.

The above and further objectives are achieved by the subject matter of the independent claims. Further advantageous implementation forms of the present invention are defined by the dependent claims and other embodiments.

According to a first aspect of the invention, the above mentioned and other objectives are achieved with a power supply circuit for a breaking circuit, the power supply circuit comprising:
- a first connecting point arranged to be connected to an input of the breaking circuit and a second connecting point arranged to be connected to an output of the breaking circuit;
- a first rectifier and a second rectifier connected in series and in opposite direction to each other between the first connecting point and the second connecting point;
- a first switch and a second switch connected in series between the first connecting point and the second connecting point, wherein the first switch and the second switch are connected in parallel to the first rectifier and the second rectifier;
- a first capacitor having a first connecting point connected between the first rectifier and the second rectifier and a second connecting point connected between the first switch and the second switch, wherein the first connecting point of the first capacitor is further arranged to be connected to a power consumer of the breaking circuit;

wherein the power supply circuit is arranged to at least one of:
- open the first switch so that a current running from the input to the output passes via the first rectifier, the first capacitor and the second switch thereby charging the first capacitor; and
- open the second switch so that a current running from the output to the input passes via the second rectifier, the first capacitor and the first switch thereby charging the first capacitor.

A rectifier can in this discloser be interpreted broadly to mean an electrical device which prevents current to pass in one direction, either permanently or temporarily. The rectifier can be a passive electrical device, such as a diode which permanently prevents current to pass in one direction, or an active electrical device, such as a switch which can be temporarily opened to prevent current to pass in one direction.

A power consumer can in this discloser be understood to mean any device which is driven by power, i.e. uses power when performing its functions. The power consumer can e.g. be controllers based on software (e.g. micro controller), controllers based on hardware (e.g. logic circuits) and communication devices.

That a switch is closed can in this discloser be understood to mean that the switch is in a conducting/ON mode where a current can run through the switch. That a switch is open can in this discloser be understood to mean that the switch is in a nonconducting/OFF mode where a current cannot run through the switch.

According to an embodiment of the first aspect of the present invention, the power supply circuit is arranged to at least one of:
- open the first switch and close the second switch so that the current running from the input to the output passes via the first rectifier, the first capacitor and the second switch thereby charging the first capacitor;
- close the first switch and open the second switch so that the current running from the output to the input passes via the second rectifier, the first capacitor and the first switch thereby charging the first capacitor.

It is however to be noted that the first switch and the second switch are in an embodiment arranged to be closed in their default states. This implies that according to this embodiment the power supply circuit is arranged to at least one of:
- open the first switch so that the current running from the input to the output passes via the first rectifier, the first capacitor and the second switch thereby charging the first capacitor;
- open the second switch so that the current running from the output to the input passes via the second rectifier, the first capacitor and the first switch thereby charging the first capacitor.

According to an embodiment of the first aspect of the present invention, the first rectifier is a third switch and the second rectifier is a fourth switch, and the power supply circuit is arranged to at least one of:
- open the first switch and subsequently close the third switch so that the current running from the input to the output passes via the third switch, the first capacitor and the second switch thereby charging the first capacitor; and
- open the second switch and subsequently close the fourth switch so that the current running from the output to the input passes via the fourth switch, the first capacitor and the first switch thereby charging the first capacitor.

According to an embodiment of the first aspect of the present invention, the first rectifier is a first diode and the second rectifier is a second diode, and wherein the first diode is arranged in a direction towards the output and the second diode is arranged in a direction towards the input.

That the first diode is arranged in a direction towards the output means that a current can only run in the direction towards the output through the first diode. That the second diode is arranged in a direction towards the input means that a current can only run in the direction towards the input through the second diode.

According to an embodiment of the first aspect of the present invention, the power supply circuit further comprising
- a third connecting point arranged to be connected between the input and a first switch of the breaking circuit and a fourth connecting point arranged to be connected between the output and a second switch of the breaking circuit;
- a third rectifier and a fourth rectifier connected in series and in opposite direction to each other between the third connecting point and the fourth connecting point;
- wherein the first connecting point of the first capacitor is connected between the third rectifier and the fourth rectifier.

According to an embodiment of the first aspect of the present invention, the third rectifier is a fifth switch and the fourth rectifier is a sixth switch.

According to an embodiment of the first aspect of the present invention, the third rectifier is a third diode arranged in a direction towards the output and the fourth rectifier is a fourth diode arranged in a direction towards the input.

According to an embodiment of the first aspect of the present invention, the power supply circuit further comprising a current limiter connected between the third rectifier, the fourth rectifier and the first connecting point of the first capacitor.

According to an embodiment of the first aspect of the present invention, the power supply further comprising
- a second capacitor having a first connecting point connected between the third rectifier and the fourth rectifier and a second connecting point connected between the first switch and the second switch of the power supply circuit.

According to an embodiment of the first aspect of the present invention, a ratio of a value of the first capacitor over a value of the second capacitor is larger than 100.

According to an embodiment of the first aspect of the present invention, at least one of the second connecting point of the first capacitor and the second point of the second capacitor is connected to a reference ground of the breaking circuit.

According to a second aspect of the invention, the above mentioned and other objectives are achieved with a power supply circuit for a breaking circuit, the power supply circuit comprising:
- a first connecting point arranged to be connected to an input of the breaking circuit and a second connecting point arranged to be connected to an output of the breaking circuit;
- a first rectifier connected between the first connecting point and the second connecting point;
- a first switch connected between the first connecting point and the second connecting point, wherein the first switch is connected in parallel to the first rectifier;
- a first capacitor having a first connecting point connected to the first rectifier and a second connecting point connected to the first switch, wherein the first connecting point of the first capacitor further is arranged to be connected to a power consumer of the breaking circuit;
- wherein the power supply circuit is arranged to open the first switch so that a current running from the input to the output pass via the first rectifier and the first capacitor thereby charging the first capacitor.

The second connecting point of the first capacitor is further arranged to be connected to the second connecting point of the power supply circuit such that the first capacitor is connected between the first rectifier and the output.

According to a third aspect of the invention, the above mentioned and other objectives are achieved with a power supply circuit for a breaking circuit, the power supply circuit comprising:
- a first connecting point arranged to be connected to an input of the breaking circuit and a second connecting point arranged to be connected to an output of the breaking circuit;
- a second rectifier connected between the first connecting point and the second connecting point;
- a second switch connected between the first connecting point and the second connecting point, wherein the second switch is connected in parallel to the second rectifier;
- a first capacitor having a first connecting point connected to the second rectifier and a second connecting point connected to the second switch, wherein the first connecting point of the first capacitor further is arranged to be connected to a power consumer of the breaking circuit;

wherein the power supply circuit is arranged to
- open the second switch so that a current running from the output to the input passes via the second rectifier and the first capacitor thereby charging the first capacitor.

The second connecting point of the first capacitor is further arranged to be connected to the first connecting point of the power supply circuit such that the first capacitor is connected between the input and the second rectifier.

According to a fourth aspect of the invention, the above mentioned and other objectives are achieved with a breaking circuit comprising a power supply circuit according to any of the preceding claims.

According to an embodiment of the fourth aspect of the present invention, the power consumer is a controller arranged to control at least one switch of the breaking circuit.

According to an embodiment of the fourth aspect of the present invention, the controller is further arranged to control at least one switch of the power supply circuit.

According to an embodiment of the fourth aspect of the present invention, the controller is connected to the reference ground.

According to an embodiment of the fourth aspect of the present invention, the power consumer is a communication device.

A communication device can in this disclosure be understood to mean a device capable of performing wired or wireless communication over a wired or wireless communication system.

According to an embodiment of the fourth aspect of the present invention, the breaking circuit is an alternating current breaking circuit.

The power supply circuit according to the present invention provides for a reliable power supply to the breaking circuit, and thus also for a reliable function of the breaking circuit. In addition, the power supply circuit makes the installation of the breaking circuit easier as no external power supply is needed.

The power supply circuit further reliably provides power supply both when the breaking circuit is in a conducting/ON mode and when the breaking circuit is in a nonconducting/

OFF mode. In addition, the power supply circuit may be used in both alternating current and direct current arrangements.

Further, the power supply circuit according to the present invention, can be made small in size, such that the arrangement can be coupled and/or mounted in conventional circuit breakers/fuses/fuse boxes.

The architecture of the power supply circuit is suitable to be implemented as chip. Thereby, making the power supply circuit and/or breaking circuit cheaper, smaller, and easier to produce.

Since the breaking circuit may be driven with a very modest supplied power, the herein presented power supply circuit will always be able to provide a sufficient and reliable power supply to the breaking circuit.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

A power supply circuit according to the invention can be arranged to perform energy harvesting to extract/draw electrical power from a so-called mains alternating current AC or mains direct current DC. The extracted electrical power may be used to drive a breaking circuit, e.g. drive components/devices included in the breaking circuit which need electrical power to run. Examples of such components, hereafter called power consumers, are controllers based on software (e.g. micro controller), controllers based on hardware (e.g. logic circuits) and communication devices.

Firstly, the functions and principles of the power supply circuit 400 in an alternating current AC scenario will be described with reference to FIGS. 1a-2d. The power supply circuit 400 may be arranged between an input 102 of a breaking circuit 100 and an output 104 of the breaking circuit 100, and further arranged to extract a parasite voltage from the alternating current AC through the breaking circuit 100. Depending on the mode of the breaking circuit 100 and whether a load is connected to the breaking circuit 100 or not, the alternating current AC through the breaking circuit 100 may be high, low, or even close to zero. The power supply circuit 400 is arranged to extract a parasite voltage in all the mentioned current situations. When the breaking circuit 100 is in a conducting/ON mode, the power supply circuit 400 is arranged to extract a first parasite voltage $V_{par1}$, as will be described with reference to FIGS. 1a-1c. On the other hand, when the breaking circuit 100 is in a nonconducting/OFF mode, the power supply circuit 400 is arranged to extract a second parasite voltage $V_{par2}$, as will be described with reference to FIGS. 2a-2d.

In the FIGS. 1a-2d, the thicker lines illustrate the pathway the alternating current AC takes through the power supply circuit 400.

Figure 1A:
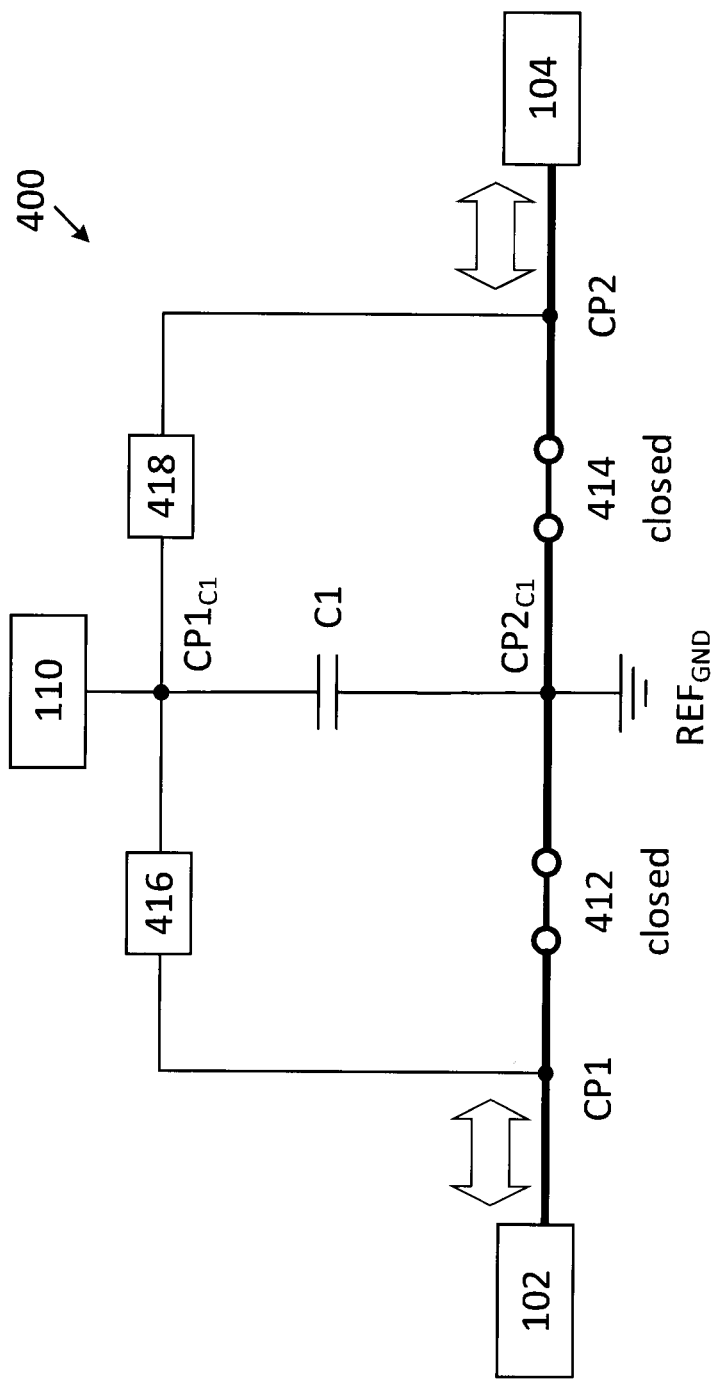
FIG. 1a-1c shows an arrangement according to some embodiments of the invention.
Figure 1B:
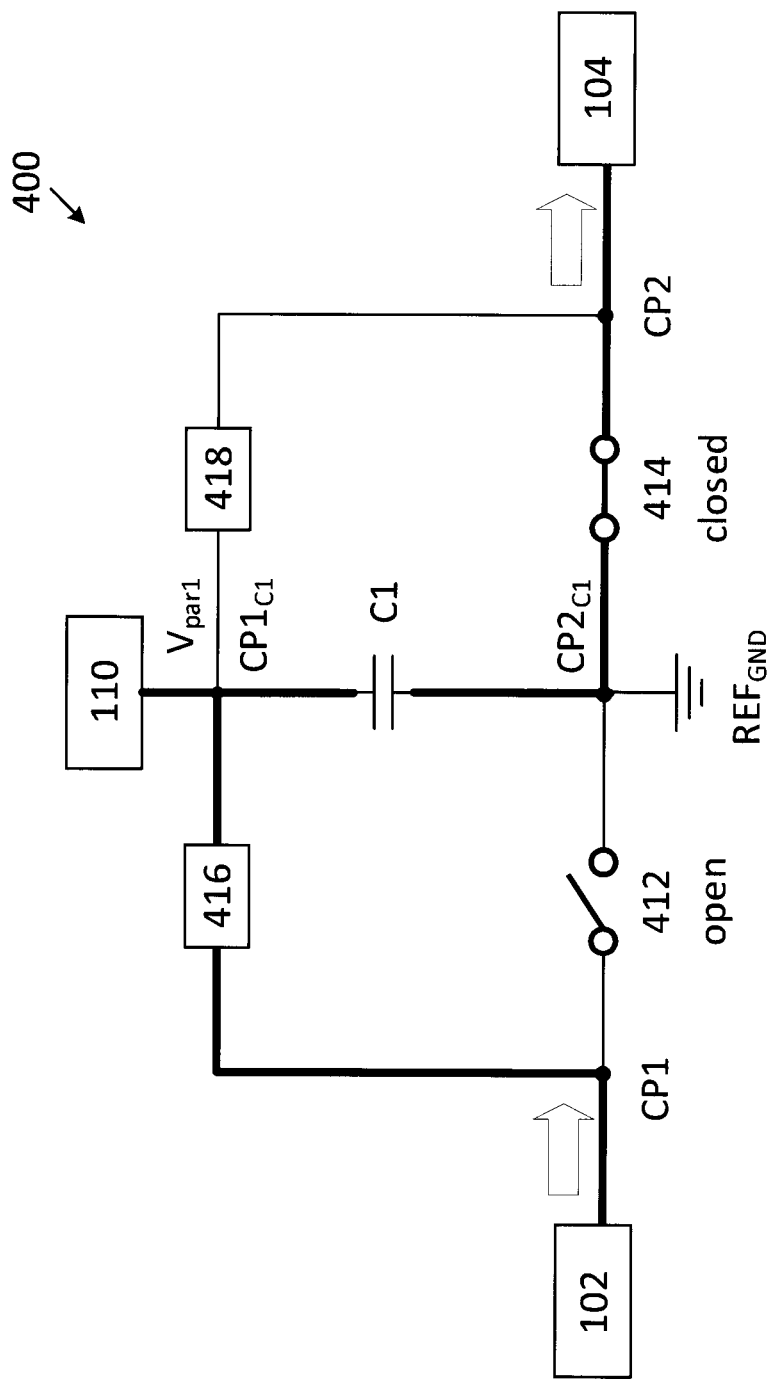
Figure 1C:
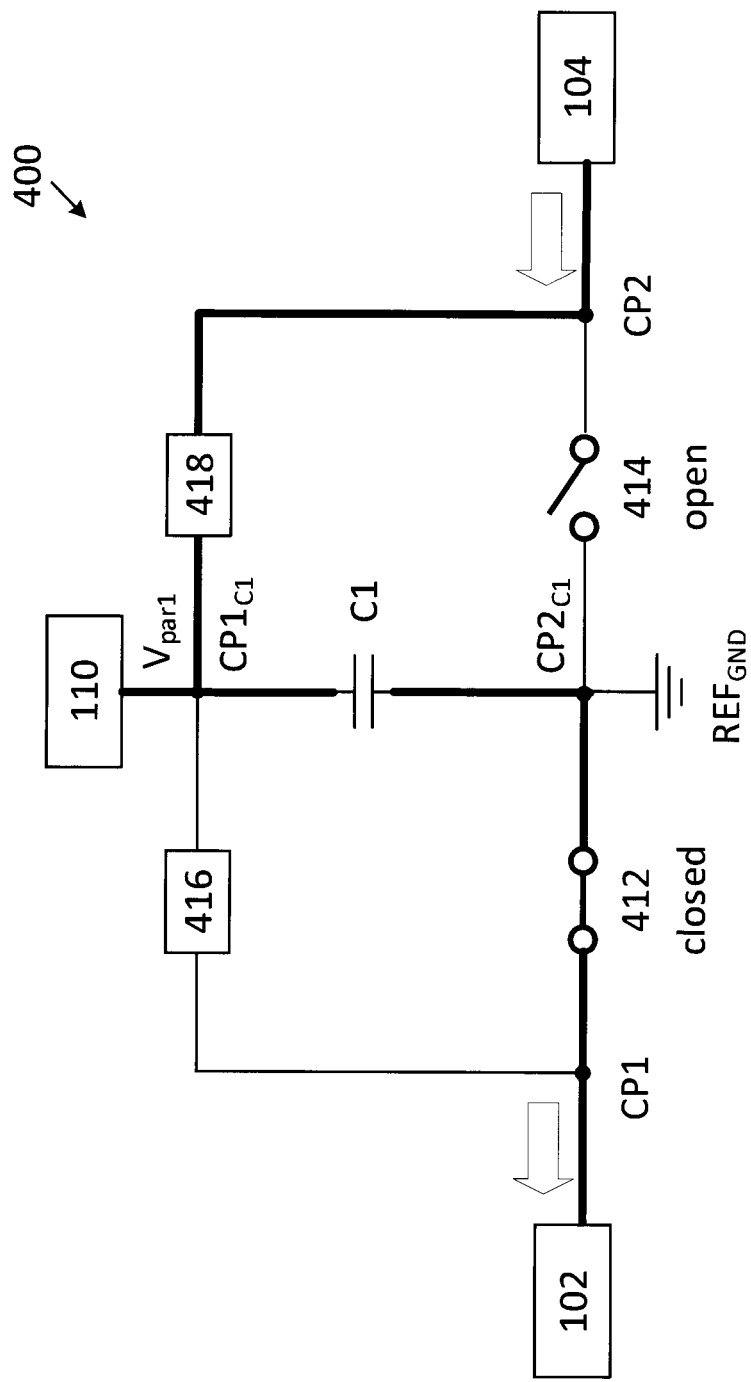

FIGS. 1a-1c schematically illustrate the power supply circuit 400 according to embodiments of the invention when the breaking circuit 100 is in a conducting/ON mode. The power supply circuit 400 may be operating in a non-extracting mode or an extracting mode. In the non-extracting mode, the alternating current AC is running through the power supply circuit 400 in such a way that no power is extracted from the alternating current AC. In the extracting mode, the alternating current AC is instead running through the power supply circuit 400 in such a way that power may be extracted from the alternating current AC and provided to the breaking circuit 100.

FIG. 1a schematically illustrates the power supply circuit 400 according to an embodiment of the invention in the non-extracting mode. The power supply circuit 400 comprises a first connecting point CP1 arranged to be connected to an input 102 of the breaking circuit 100 and a second connecting point CP2 arranged to be connected to an output 104 of the breaking circuit 100, as shown in FIG. 1a. The output 104 of the breaking circuit 100 may be coupled to one or more electrical loads 200a, 200b, . . . 200N (not shown in FIG. 1a). An alternating current AC is fed to the input 102 of the breaking circuit 100 and forwarded to the loads 200a, 200b, . . . 200N via the output 104 of the breaking circuit 100. The loads 200a, 200b, . . . 200N may comprise household appliances and/or electrical heaters and/or other household electronics and/or essentially any other devices configured to be fed with alternating current AC.

The power supply circuit 400 further comprises a first rectifier 416 and a second rectifier 418 connected in series and in opposite direction to each other between the first connecting point CP1 and the second connecting point CP2, as well as a first switch 412 and a second switch 414 connected in series between the first connecting point CP1 and the second connecting point CP2. The first switch 412 and the second switch 414 are connected in parallel to the first rectifier 416 and the second rectifier 418, as shown in FIG. 1a. Furthermore, the power supply circuit 400 comprises a first capacitor C1 having a first connecting point $CP1_{C1}$ connected between the first rectifier 416 and the second rectifier 418 and a second connecting point $CP2_{C1}$ connected between the first switch 412 and the second switch 414. The first connecting point $CP1_{C1}$ of the first capacitor C1 is further arranged to be connected to a power consumer 110a, 110b, . . . , 110n of the breaking circuit 100. In the Figs. the power consumer 110a, 110b, . . . , 110n is exemplified with a controller 110. However, different types of power consumers 110a, 110b, . . . , 110n, as well as any number of power consumers 110a, 110b, . . . , 110n, may be connected to the first connecting point $CP1_{C1}$ without deviating from the scope of the invention. The second connecting point $CP2_{C1}$ of the first capacitor C1 may be connected to a reference ground $REF_{GND}$ of the breaking circuit 100.

In FIG. 1a, the power supply circuit 400 is shown in the non-extracting mode. This means that the first switch 412 and the second switch 414 are both closed. Thus, the alternating current AC between the input 102 of the breaking circuit 100 and the output 104 of the breaking circuit 100 is running through the first switch 412 and the second switch 414, as indicated by the thicker lines in FIG. 1a. The power supply circuit 400 only cause negligible losses to the alternating current AC running through the power supply circuit 400.

The extracting mode of the power supply circuit 400 is reached by opening the first switch 412 or the second switch 414 as will now be described with reference to FIGS. 1b and 1c. FIG. 1b shows the power supply circuit 400 in the extracting mode during a positive half period of the alternating current AC, i.e. when current is running from the input 102 of the breaking circuit 100 to the output 104 of the breaking circuit 100, as indicated by the big arrows in FIG. 1b. To start extracting power during the positive half period, the first switch 412 is opened and the second switch 414 may be closed (if not already closed). The first switch 412 may be opened during at least one part, e.g. an initial part, of the positive half period. According to embodiments, the first switch 412 may be closed after the at least one part of the positive half period, e.g. for the rest of the half period. This is advantageous, since theenergy may then be harvested while only causing negligible affect to loads 200n connected to the output 104 of the breaking circuit 100. While the first switch 412 is open and the second switch 414 is closed the current running from the input 102 to the output 104 passes via the first rectifier 416, the first capacitor C1 and the second switch 414, as indicated by the thicker lines in FIG. 1b. Thereby, the first capacitor C1 is charged and a first parasite voltage $V_{par1}$ may be provided as a power supply to the power consumer 110a, 110b, ..., 110n of the breaking circuit 100. According to embodiments of the invention, the first parasite voltage $V_{par1}$ is created by the first capacitor C1 arranged between the first rectifier 416 and the reference ground $REF_{GND}$. When the first capacitor C1 is charged, the first parasite voltage $V_{par1}$ is created as an electric potential difference over the first capacitor C1.

FIG. 1c shows the power supply circuit 400 in the extracting mode during a negative half period of the alternating current AC, i.e. when current is running from the output 104 of the breaking circuit 100 to the input 102 of the breaking circuit 100, as indicated by the big arrows in FIG. 1c. To start extracting power during the negative half period, the second switch 414 is opened and the first switch 412 may be closed (if not already closed). The second switch 414 may be opened during at least one part, e.g. an initial part, of the negative half period. According to an embodiment, the second switch 414 may be closed after the at least one part of the negative half period, e.g. for the rest of the half period. This is advantageous, since the energy may then be harvested while only causing negligible affect to loads 200n connected to the output 104 of the breaking circuit. While the first switch 412 is closed and the second switch 414 is open the current running from the output 104 to the input 102 passes via the second rectifier 418, the first capacitor C1 and the first switch 412, as indicated by the thicker lines in FIG. 1c. Thereby, the first capacitor C1 is charged and a first parasite voltage $V_{par1}$ can be provided as a power supply to the power consumer 110a, 110b, ..., 110n of the breaking circuit 100, as previously described with reference to FIG. 1b.

Figure 4:
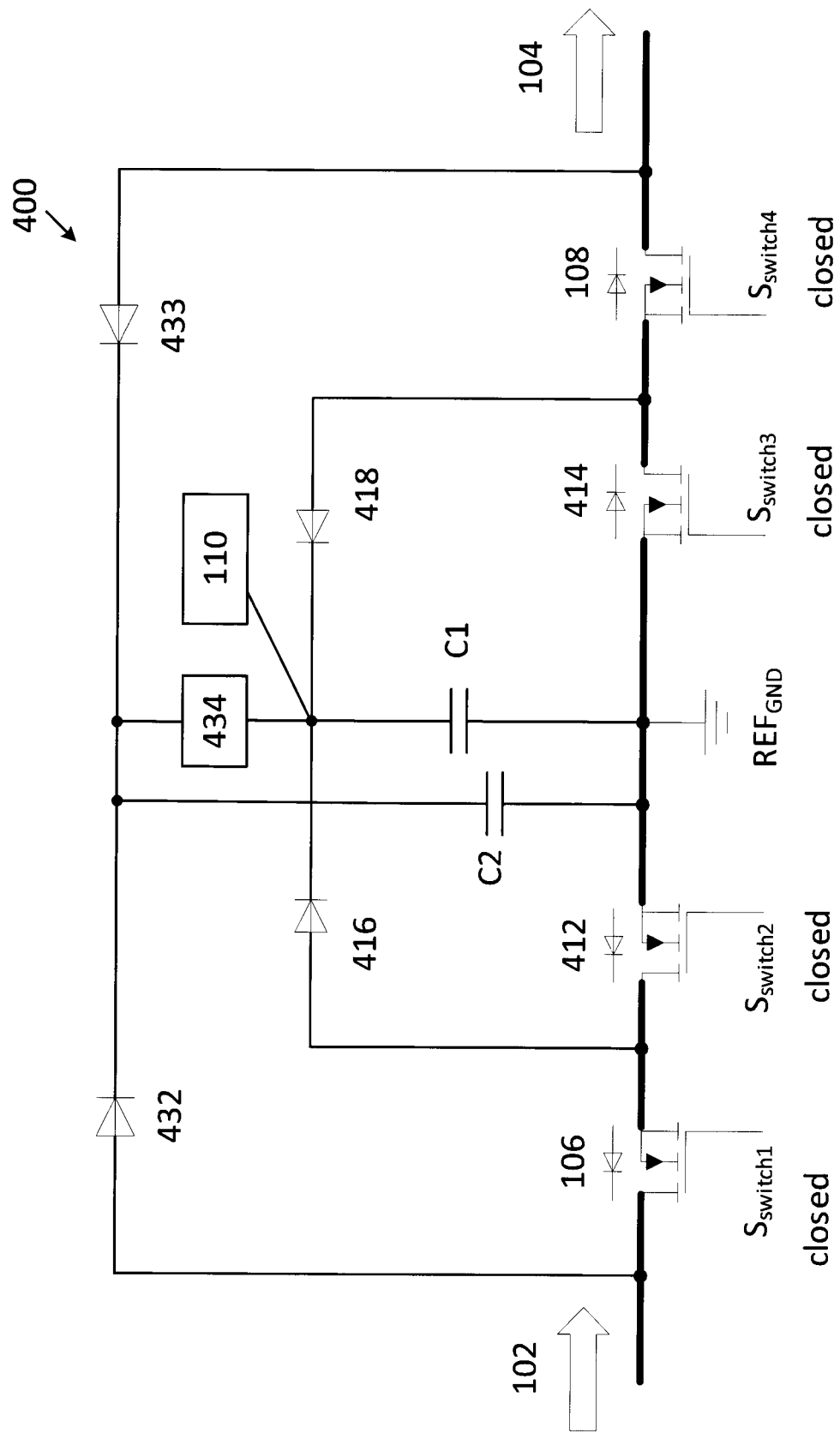
FIG. 4 shows an arrangement according to some embodiments of the invention.

The first rectifier 416 and the second rectifier 418 may according to embodiments of the invention be diodes. In this case, the first rectifier 416 may be a first diode and the second rectifier 418 may be a second diode. The first diode is arranged in a direction towards the output 104 and the second diode is arranged in a direction towards the input 102 (as shown in FIG. 4). However, in embodiments of the invention the first rectifier 416 and the second rectifier 418 may instead be switches (not shown in the Figs.). In such embodiments, the first rectifier 416 may be a third switch and the second rectifier 418 may be a fourth switch. Furthermore, the power supply circuit 400 may in such embodiments be arranged to at least one of: open the first switch 412 and subsequently close the third switch so that the current running from the input 102 to the output 104 passes via the third switch, the first capacitor C1 and the second switch 414 thereby charging the first capacitor C1; and open the second switch 414 and subsequently close the fourth switch so that the current running from the output 104 to the input 102 passes via the fourth switch, the first capacitor C1 and the first switch 412 thereby charging the first capacitor C1.

The functions and principles of the power supply circuit 400 further arranged to extract a second parasite voltage $V_{par2}$ when the breaking circuit 100 is in a nonconducting/OFF mode will now be described with reference to FIG. 2a-d). In the embodiments shown in FIG. 2a-d), the breaking circuit 100 comprises a first switch 106 and a second switch 108. Furthermore, the power supply circuit 400 comprises a third connecting point CP3 arranged to be connected between the input 102 and the first switch 106 of the breaking circuit 100 and a fourth connecting point CP4 arranged to be connected between the output 104 and the second switch 108 of the breaking circuit 100. A third rectifier 432 and a fourth rectifier 433 are connected in series and in opposite direction to each other between the third connecting point CP3 and the fourth connecting point CP4. As shown in FIGS. 2a-2d, the first connecting point $CP1_{C1}$ of the first capacitor C1 is connected between the third rectifier 432 and the fourth rectifier 433. This results in that the first capacitor C1 can be charged also when the first switch 106 and/or the second 108 of the breaking circuit 100 breaks the alternating current AC, i.e. when one or more of the first switch 106 and the second 108 are open.

In the embodiments shown in FIGS. 2a-2d, the power supply circuit 400 further comprises one or more current limiters 434 arranged to limit the current being provided to the first capacitor C1. FIGS. 2a-2d shows a current limiter 434 connected between the third rectifier 432, the fourth rectifier 433 and the first connecting point $CP1_{C1}$ of the first capacitor C1. The current limiter 434 may limit the current to a pre-set value and may either be constant or controllable. Thereby, the first capacitor C1 can be overvoltage protected. The current limiter 434 may be implemented according to solutions known in the art.

Figure 2A:
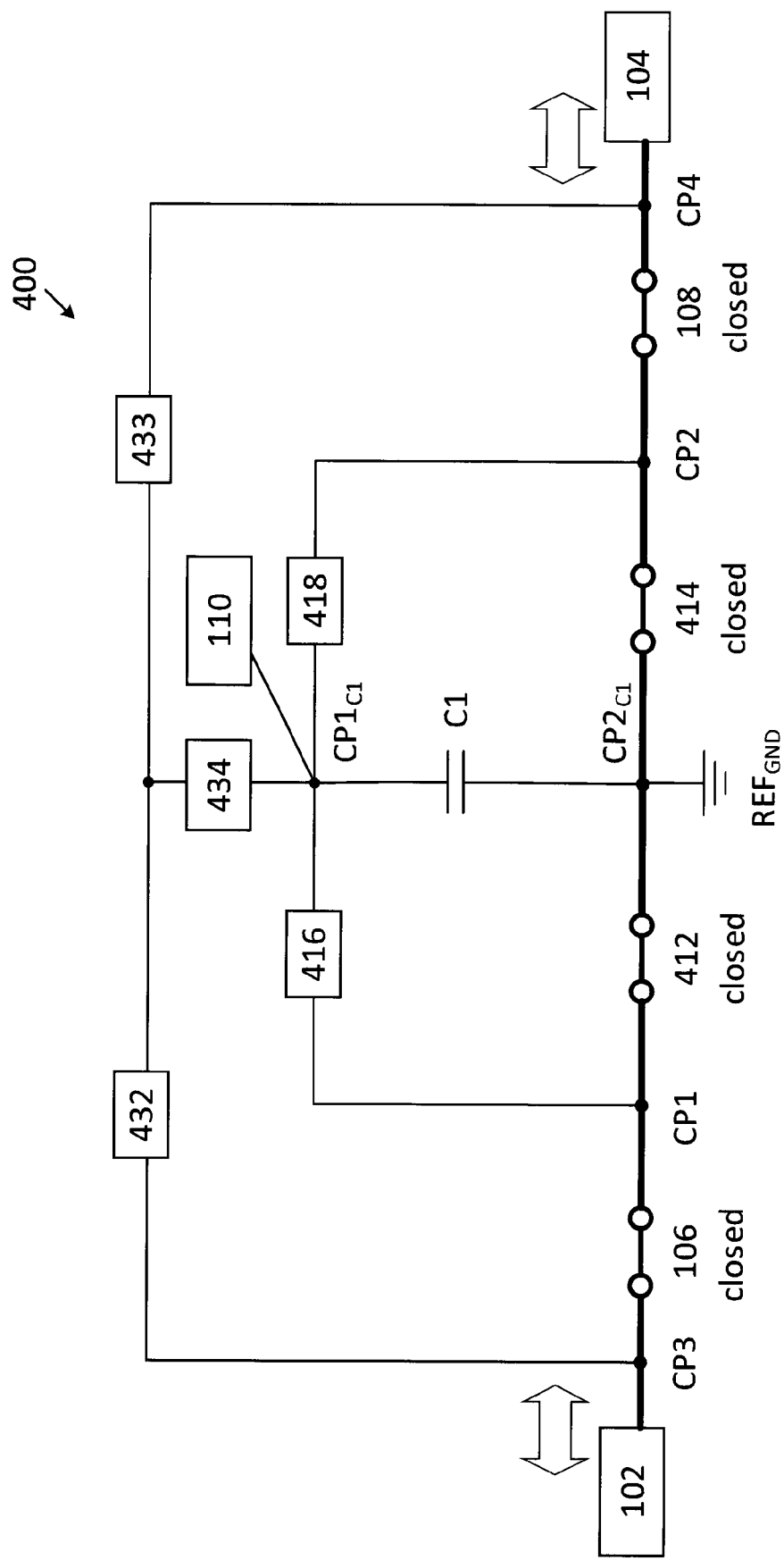
FIG. 2a-2d shows an arrangement according to some embodiments of the invention.

FIG. 2a shows the power supply 400 arranged to extract a second parasite voltage $V_{par2}$ when the breaking circuit 100 is still in a conducting/ON mode, i.e. the first switch 106 and the second switch 108 of the breaking circuit 100 are still closed. The first switch 412 and the second switch 414 of the power supply circuit 400 are also closed. As indicated by the thicker line in FIG. 2a, the alternating current AC is therefore running through the first switch 106 and the second switch 108 of the breaking circuit 100, as well as through the first switch 412 and the second switch 414 of the power supply circuit 400.

When one or more of the first switch 106 and the second switch 108 of the breaking circuit 100 are open, the first capacitor C1 may be charged via the third rectifier 432 or the fourth rectifier 433. In embodiments, the first switch 106 and the second switch 108 of the breaking circuit 100 may be opened at the same time. The first switch 106 and/or the second switch 108 of the breaking circuit 100 may be opened by a controller in the breaking circuit 100 either to protect loads 200n connected to the breaking circuit 100 from e.g. overcurrent or specifically to charge the capacitor C1. In the latter case, the first switch 106 and/or second switch 108 of the breaking circuit 100 may be opened during at least one part, e.g. an initial part, of the positive/negative half period, as previously described with reference to FIGS. 1b and c).

Figure 2B:
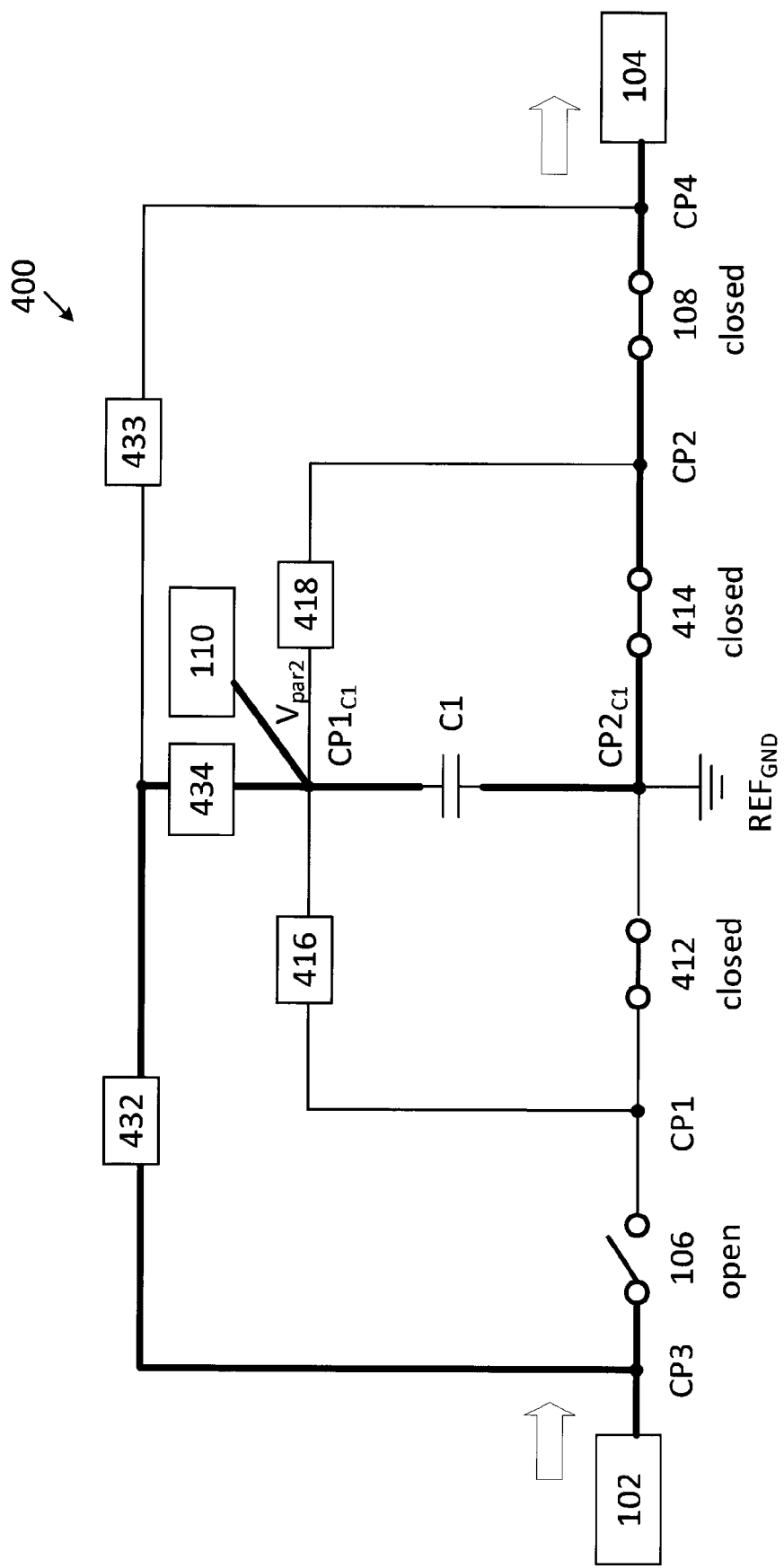

In FIG. 2b, the first switch 106 of the breaking circuit 100 is open during a positive half period of the alternating current AC. Thus, the current runs from the input 102, through the third rectifier 432, through the current limiter 434, through the first capacitor C1, and further through the second switch 414 of the power supply circuit 400 and the second switch 108 of the breaking circuit 100. Thereby, the first capacitor C1 is charged and a second parasite voltage $V_{par2}$ may be provided as a power supply to the power consumer 110a, 110b, . . . , 110n of the breaking circuit 100. In FIG. 2b, the second switch 414 of the power supply circuit 400 and the second switch 108 of the breaking circuit 100 are shown to be closed. However, depending on the situation each of the second switch 414 of the power supply circuit 400 and the second switch 108 of the breaking circuit 100 may be either open or closed. The second switch 414 of the power supply circuit 400 and the second switch 108 of the breaking circuit 100 may be switches with an internal body diode, e.g. field effect transistors (FETs) as will be described below with reference to FIG. 4. In this case, when the second switch 414 of the power supply circuit 400 is closed the current runs through the second switch 414, while if the second switch 414 is open the current runs through a body diode of the second switch 414 during the positive half period shown in FIG. 2b. In the same way, when the second switch 108 of the breaking circuit 100 is closed the current runs through the second switch 108, while if the second switch 108 is open the current runs through a body diode of the second switch 108 during the positive half period shown in FIG. 2b.

Figure 2C:
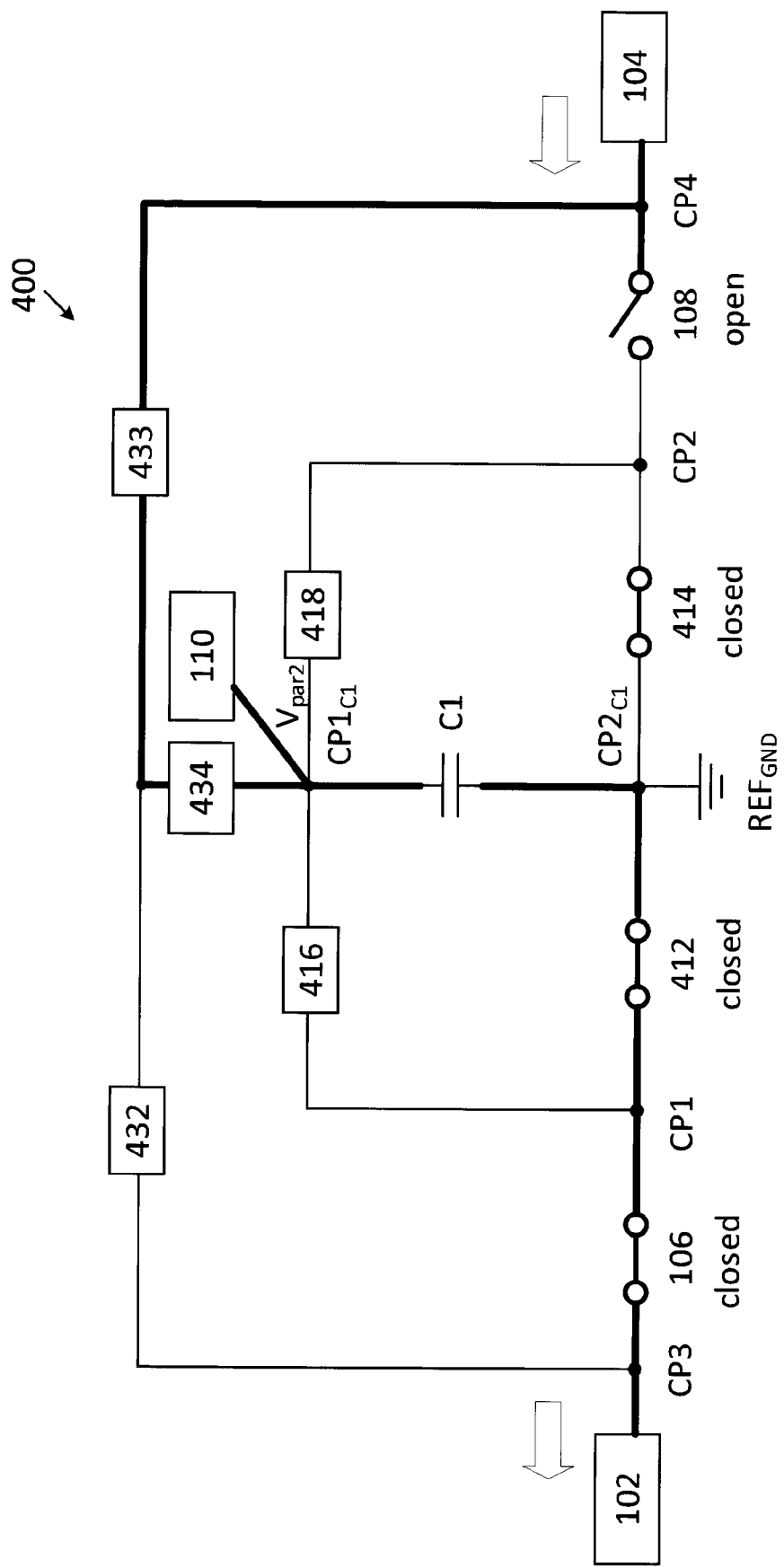

In FIG. 2c, the second switch 108 of the breaking circuit 100 is open during a negative half period of the alternating current AC. Thus, the current runs from the output 104, through the at least one third charging diode 433, through the current limiter 434, through the first capacitor C1, and further through the first switch 412 of the power supply circuit 400 and the first switch 106 of the breaking circuit 100. Thereby, the first capacitor C1 is charged and a second parasite voltage $V_{par2}$ may be provided as a power supply to the power consumer 110a, 110b, . . . , 110n of the breaking circuit 100. In the same way as described with reference to FIG. 2b for the second switch 414 of the power supply circuit 400 and the second switch 108 of the breaking circuit 100, the first switch 412 of the power supply circuit 400 and the first switch 106 of the breaking circuit 100 may depending on the situation either be open or closed, independently of each other.

The power supply circuit 400 according to the embodiments shown in FIGS. 2a-2d allows the first capacitor C1 to be charged during both the positive and negative half periods of the alternating current AC when at least one of the first switch 106 and the second switch 108 of the breaking circuit 100 are open. According to an embodiment, the first switch 106 and/or the second switch 108 of the breaking circuit 100 are kept open during at least one part of the half periods. In this way, the first capacitor C1 may be charged during the at least one part of all the positive and/or the negative half periods. Hence, it is ensured that there is always enough power extracted in order to supply the breaking circuit 100 with power to run the power consumers 110a, 110b, . . . , 110n of the breaking circuit 100.

Furthermore, when using the power supply circuit 400 according to the invention the alternating current AC is made to run through the first capacitor C1 in one and the same direction for both positive and negative half periods of the alternating current AC.

Figure 2D:
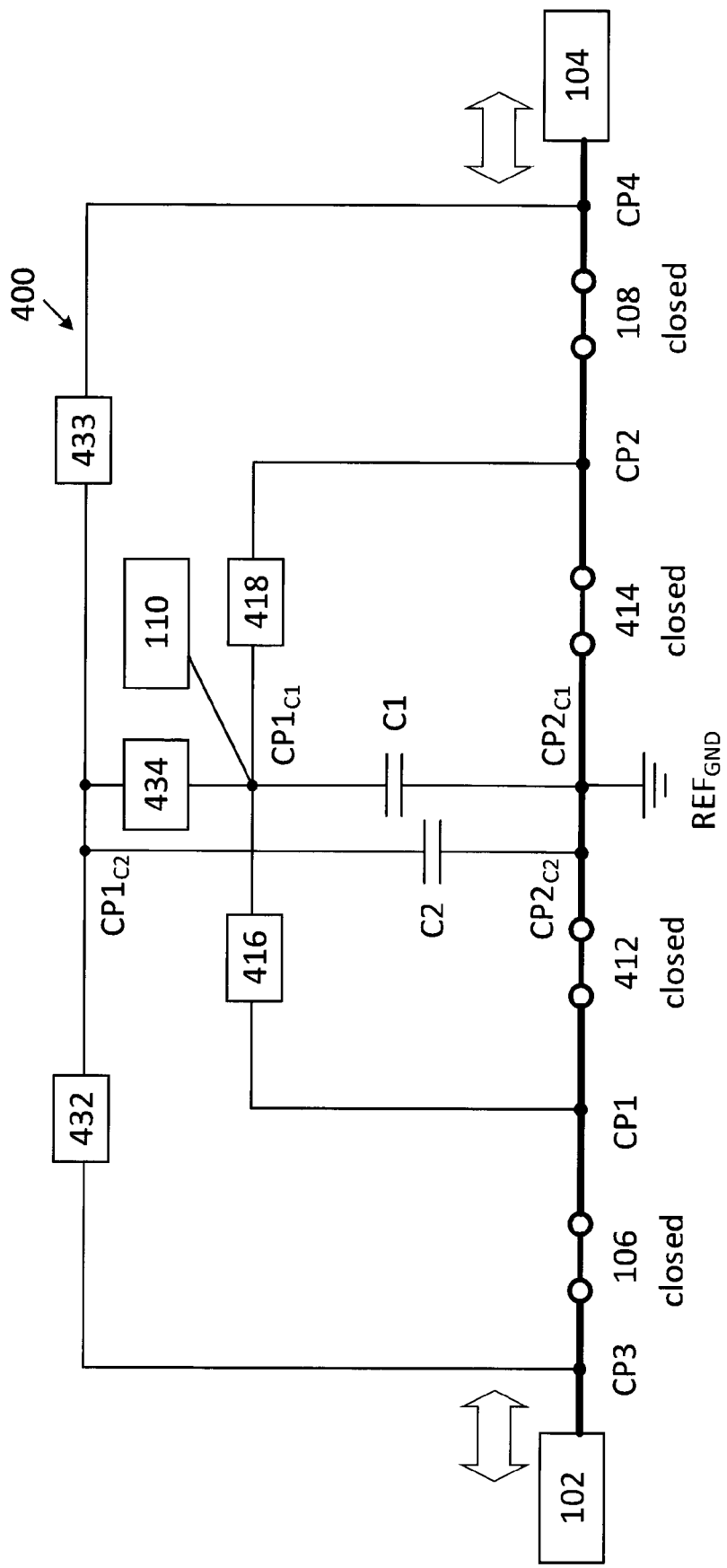

FIG. 2d further shows the power supply circuit 400 comprising a second capacitor C2. The second capacitor C2 has a first connecting point $CP1_{C2}$ connected between the third rectifier 432 and the fourth rectifier 433 and a second connecting point $CP2_{C2}$ connected between the first switch 412 and the second switch 414 of the power supply circuit 400. As shown in FIG. 2d, the second connecting point $CP2_{C2}$ of the second capacitor C2 may be connected to the reference ground $REF_{GND}$ of the breaking circuit 100. In embodiments, a ratio of a value of the first capacitor C1 over a value of the second capacitor C2 is larger than 100. For example, the second capacitor C2 may be a high voltage capacitor, while the first capacitor C1 may be a low voltage capacitor. When the breaking circuit 100 is in nonconducting/OFF mode current will run through the second capacitor C2 which thereby will be charged. This leads to a charge being built up and stored in the second capacitor C2. The energy stored in the second capacitor C2 may be transferred to the first capacitor C1 via the current limiter/switch 434. Hence, a second parasite voltage $V_{par2}$ may be provided as a power supply to the power consumer 110a, 110b, . . . , 110n of the breaking circuit 100. It is to be noted that the second capacitor C2 is not connected between the first rectifier 416 and the second rectifier 418.

The third rectifier 432 and the fourth rectifier 433 may according to embodiments of the invention be diodes. In this case, the third rectifier 432 may be a third diode arranged in a direction towards the output 104 and the fourth rectifier 433 may be a fourth diode arranged in a direction towards the input 102 (as shown in FIG. 4). However, in embodiments of the invention the third rectifier 432 and the fourth rectifier 433 may instead be switches (not shown in the Figs.). In such embodiments, the third rectifier 432 may be a fifth switch and the fourth rectifier 433 may be a sixth switch. Furthermore, the power supply circuit 400 may in such embodiments be arranged to charge the first capacitor C1 by closing and opening the fifth switch and the sixth switch. The power supply circuit 400 may e.g. close the fifth switch and open the sixth switch so that the current running from the input 102 to the output 104 passes via the fifth switch, the first capacitor C1 and the second switch 414 of the power supply circuit 400 and the second switch 108 of the breaking circuit 100 in the extracting mode. In addition, the power supply circuit 400 may close the sixth switch and open the fifth switch so that the current running from the output 104 to the input 102 passes via the sixth switch, the first capacitor C1 and the first switch 412 of the power supply circuit 400 and the first switch 106 of the breaking circuit in the extracting mode.

Figure 3A:
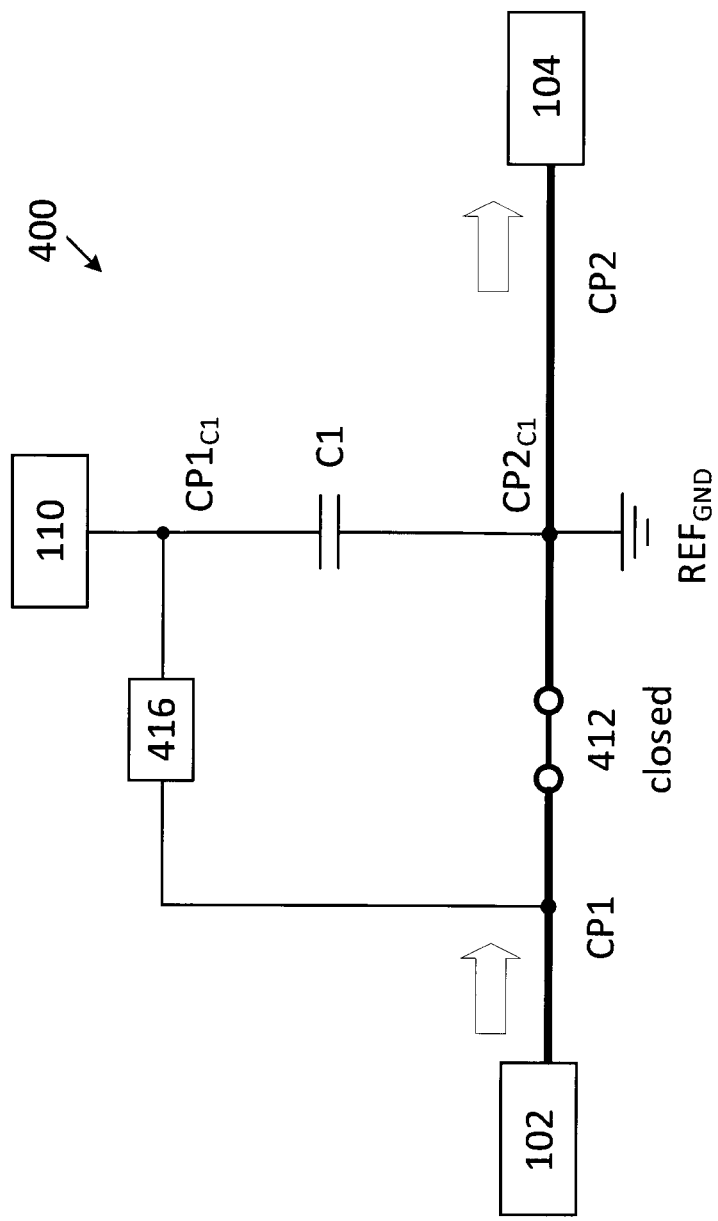
FIG. 3a-3c shows an arrangement according to some embodiments of the invention.
Figure 3B:
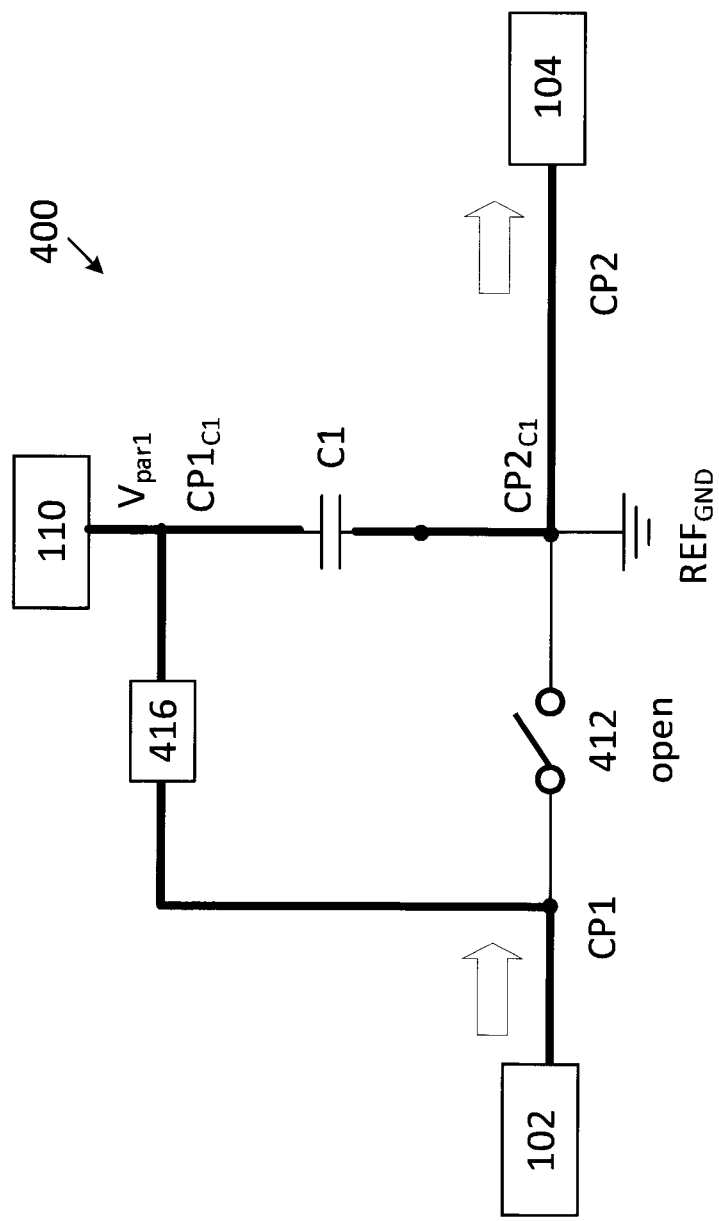

According to embodiments of the invention, the power supply circuit 400 may further be used with a breaking circuit 100 for breaking direct current DC. FIGS. 3a-3b shows a power supply circuit 400 according to such an embodiment. In the embodiment shown in FIGS. 3a-3b, the power supply circuit 400 may extract power from a direct current DC running from the input 102 to the output 104 of the breaking circuit 100. The power supply circuit 400 comprises a first connecting point CP1 arranged to be connected to an input 102 of the breaking circuit 100 and a second connecting point CP2 arranged to be connected to an output 104 of the breaking circuit 100. The power supply circuit 400 further comprises a first rectifier 416 connected between the first connecting point CP1 and the second connecting point CP2 and a first switch 412 connected between the first connecting point CP1 and the second connecting point CP2. The first switch 412 is connected in parallel to the first rectifier 416, as shown in FIGS. 3a-3b. The power supply circuit 400 further comprises a first capacitor C1 having a first connecting point $CP1_{C1}$ connected to the first rectifier 416 and a second connecting point $CP2_{C1}$ connected to the first switch 412. The second connecting point $CP2_{C1}$ of the first capacitor C1 is further arranged to be connected to the second connecting point CP2 of the power supply circuit 400 such that the first capacitor C1 is connected between the first rectifier 416 and the output 104 The first connecting point $CP1_{C1}$ of the first capacitor C1 further is arranged to be connected to a power consumer 110 of the breaking circuit 100. The second connecting point $CP2_{C1}$ of the first capacitor C1 may be connected to a reference ground $REF_{GND}$ of the breaking circuit 100.

In FIG. 3a, the power supply circuit 400 is shown in the non-extracting mode when the first switch 412 is closed. Thus, the direct current DC from the input 102 of the breaking circuit 100 to the output 104 of the breaking circuit 100 is running through the first switch 412, as indicated by the big arrows and the thicker lines in FIG. 3a.

The extracting mode of the power supply circuit 400 is reached by opening the first switch 412 as will now be described with reference to FIG. 3b. To start extracting power, the first switch 412 is opened. While the first switch 412 is open the current running from the input 102 to the output 104 passes via the first rectifier 416 and the first capacitor C1, as indicated by the thicker lines in FIG. 3b. Thereby, the first capacitor C1 is charged and a first parasite voltage $V_{par1}$ may be provided as a power supply to the power consumer 110a, 110b, ..., 110n of the breaking circuit 100. According to embodiments of the invention, the first parasite voltage $V_{par1}$ is created by the first charging capacitor C1 arranged between the first rectifier 416 and the reference ground $REF_{GND}$. When the first charging capacitor C1 is charged, the first parasite voltage $V_{par1}$ is created as an electric potential difference over the first charging capacitor C1 built up by the charge of the first charging capacitor C1.

Figure 3C:
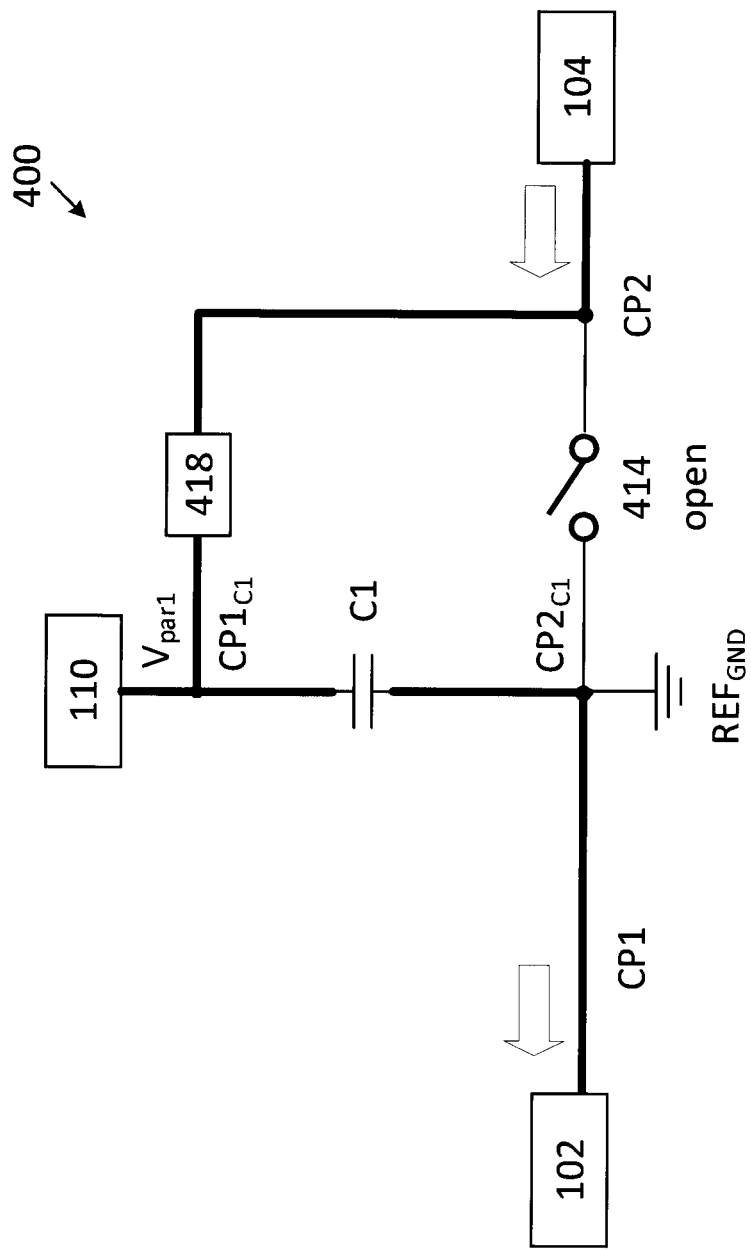

FIG. 3c shows a further embodiment of a power supply circuit 400 used with a breaking circuit 100 for breaking direct current DC. In the embodiment shown in FIG. 3c, the power supply circuit 400 may extract power from a direct current DC running from the output 104 to the input 102 of the breaking circuit 100. The power supply circuit 400 comprises a first connecting point CP1 arranged to be connected to an input 102 of the breaking circuit 100 and a second connecting point CP2 arranged to be connected to an output 104 of the breaking circuit 100. The power supply circuit 400 further comprises a second rectifier 418 connected between the first connecting point CP1 and the second connecting point CP2 and a second switch 414 connected between the first connecting point CP1 and the second connecting point CP2. The second switch 414 is connected in parallel to the second rectifier 418, as shown in FIG. 3c. The power supply circuit 400 further comprises a first capacitor C1 having a first connecting point $CP1_{C1}$ connected to the second rectifier 418 and a second connecting point $CP2_{C1}$ connected to the second switch 414. The second connecting point $CP2_{C1}$ of the first capacitor C1 is further arranged to be connected to the first connecting point CP1 of the power supply circuit 400 such that the first capacitor C1 is connected between the input 102 and the second rectifier 418. The first connecting point $CP1_{C1}$ of the first capacitor C1 further is arranged to be connected to a power consumer 110 of the breaking circuit 100. The second connecting point $CP2_{C1}$ of the first capacitor C1 may be connected to a reference ground $REF_{GND}$ of the breaking circuit 100. In FIG. 3c, the power supply circuit 100 is shown in the extracting mode. This means that the second switch 414 is open so that a current running from the output 104 to the input 102 passes via the second rectifier 418 and the first capacitor C1. Thereby, the first capacitor C1 is charged and a first parasite voltage $V_{par1}$ may be provided to the power consumer 110 as previously described e.g. with reference to FIG. 3b.

According to an embodiment of the invention one or more of the switches of the breaking circuit 100 and the power supply circuit 400 may be field effect transistors (FET). FIG. 4 shows an embodiment where the first switch 106 and the second switch 108 of the breaking circuit 100, as well as the first switch 412 and the second switch 414 of the power supply circuit 400, are FETs. As shown in FIG. 4, the first switch 106 and the second switch 108 of the breaking circuit 100 are serially coupled in opposite directions between the input 102 and the output 104. A FET can block the current in one direction, and hence the two FETs in this embodiment are coupled in opposite direction relative to the direction of the current. The two FETs may in embodiments be integrated in one component. The FETs have a fast/short switching time (i.e. the time period for opening or closing the switch), which means that the current through the FETs can be broken very quickly when an overcurrent is detected, thereby limiting or eliminating potential damages to circuits and loads coupled to the output 104. Furthermore, the first switch 412 and the second switch 414 of the power supply circuit 400 are serially coupled in opposite directions between the input 102 and the output 104. FETs, and also other switching devices/components, may comprise an internal body diode between the connectors, such as between the source (S) and drain (D) connectors of the FET, wherein the body diodes result from the physical characteristics of the FETs. These body diodes are schematically illustrated adjacent to the FETs 106, 108, 412, 414 in FIG. 4.

FIG. 4 shows a positive half period of the alternating current AC where the current is running from the input 102 of the breaking circuit 100 to the output 104 of the breaking circuit 100, as indicated by the big arrows in FIG. 4. Furthermore, the breaking circuit 100 is in conducting/ON mode and the power supply circuit 400 is in a non-extracting mode. Therefore, the first switch 106 and the second switch 108 of the breaking circuit 100, as well as the first switch 412 and the second switch 414 are closed. Due to the direction of the current, this means that the current is running from the input 102 through the first switch 106 of the breaking circuit 100, the first switch 412 of the power supply circuit 400, the second switch 414 of the power supply circuit 400, and the second switch 108 of the breaking circuit 100 to the output 104, as shown in FIG. 4.

According to embodiments of the invention any of the switches of the breaking circuit 100 and the power supply circuit 400 described in this disclosure may be controlled by a controller 110 of the breaking circuit 100, e.g. based on a switching control signal. Hence, each of the FETs 106, 108, 412, 414 shown in FIG. 4 may be arranged to be controlled/switched based on one or more switching control signals $S_{switch}$. In FIG. 4, the first switch 106 of the breaking circuit 100 is switched based on a first switching control signal $S_{switch1}$, the first switch 412 of the power supply circuit 400 is switched based on a second switching control signal $S_{switch2}$, the second switch 414 of the power supply circuit 400 is switched based on a third switching control signal $S_{switch3}$, and the second switch 108 of the breaking circuit 100 is switched based on a fourth switching control signal $S_{switch4}$. The switching control signals $S_{switch1}$, $S_{switch2}$, $S_{switch3}$, $S_{switch4}$ may be transmitted from the one or more controllers 110, possibly by using a common gate voltage thereby simplifying the circuit architecture. It is noted that the connection from the controller 110 to the FETs 106, 108, 412, 414 used to transmit the switching control signals $S_{switch1}$, $S_{switch2}$, $S_{switch3}$, $S_{switch4}$ is not shown in FIG. 4.

In FIG. 4 the first first rectifier 416, the second rectifier 418, the third rectifier 432 and the fourth rectifier 433 are shown as being diodes. However, in embodiments where one or more of first rectifier 416, the second rectifier 418, the third rectifier 432 and the fourth rectifier 433 are switches, these switches may also be FETs. The function and control of these FETs 416, 418, 432, 433 may be implemented in the same way as for the FETs 106, 108, 412, 414 already described with reference to FIG. 4.

The invention further relates to a breaking circuit 100 comprising a power supply circuit 400 according to any embodiments of the invention. The breaking circuit 100 may be an alternating current AC breaking circuit or a direct current DC breaking circuit. The power supply circuit 400 comprised in the breaking circuit 100 may extract power and provide the power to a power consumer 110a, 110b, . . . , 110n of the breaking circuit 100. The power consumer 110a, 110b, . . . , 110n may e.g. be a controller 110 arranged to control a first switch 106 and/or a second switch 108 of the breaking circuit 100, as previously described. In embodiments, the controller 110 may further be arranged to control at least one switch of the power supply circuit 400. For example, the controller 100 may be arranged to control the opening and closing of the first switch 412 and/or the second switch 414 of the power supply circuit 400, as previously described. Thereby, the extraction of power by the power supply circuit 400 may be controlled by the controller 110 of the breaking circuit 100. In embodiments where any of the first rectifier 416, the second rectifier 418, the third rectifier 432 and the fourth rectifier 433 of the power supply circuit 400 are implemented as switches, the opening and closing of these switches may also be controlled by the controller 110.

The power consumer 110a, 110b, . . . , 110n supplied with power by the power supply circuit 400 may further be a communication device. For example, a communication device which is used to remotely control the breaking circuit 100 or provide information, such as e.g. measured current, from the breaking circuit 100. The communication device may be capable of performing wired or wireless communication over a wired or wireless communication system, respectively.

Figure 5:
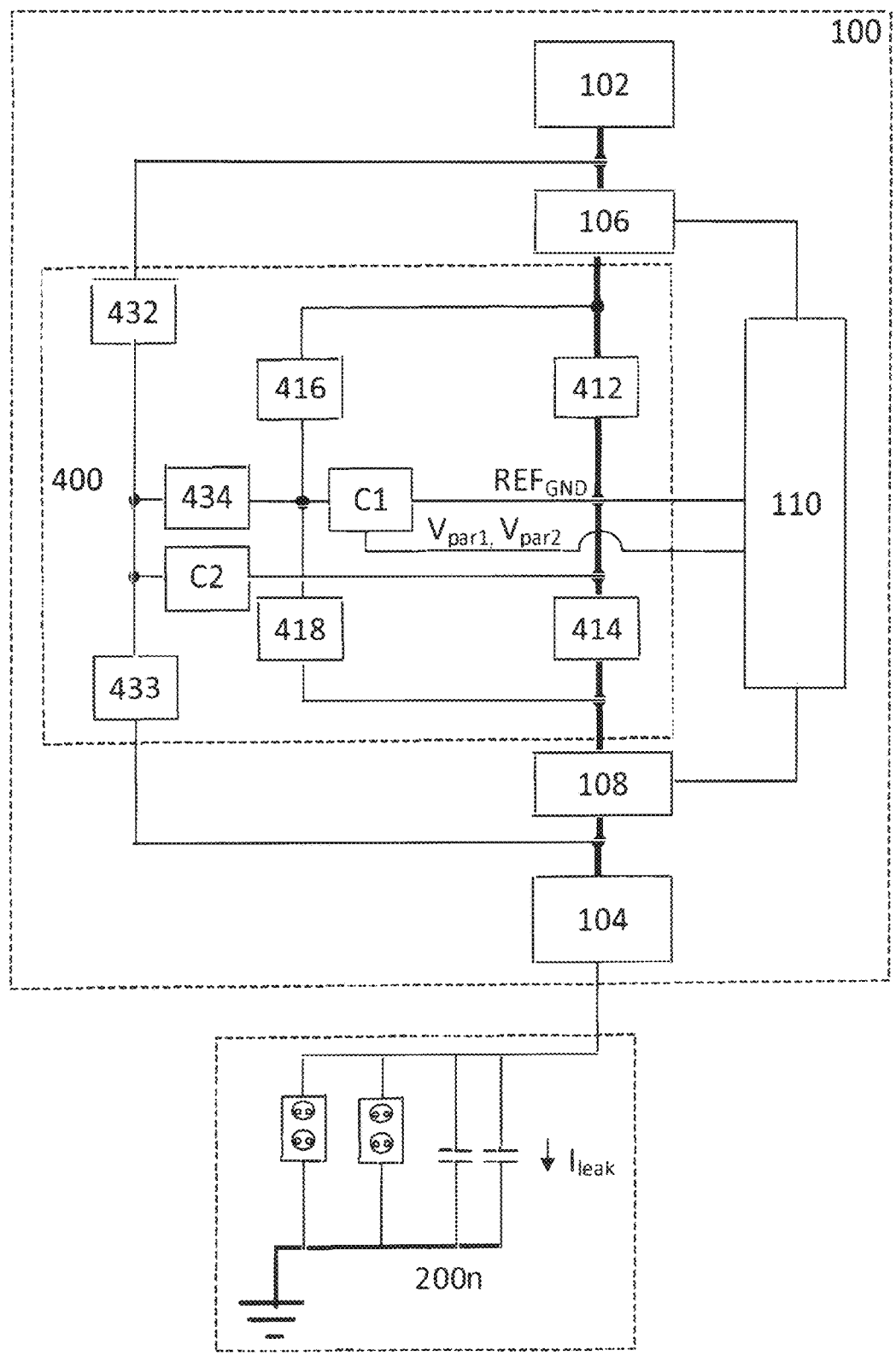
FIG. 5 shows an arrangement according to some embodiments of the invention.

FIG. 5 schematically illustrate embodiments of a breaking circuit 100 comprising a power supply circuit 400 according to the present invention, where the power supply circuit 400 is arranged to provide a parasite voltage $V_{par}$ as a power supply to the breaking circuit 100. The breaking circuit 100 is arranged according to some embodiments of the present invention to be able to brake alternating current AC. The breaking circuit 100 may be coupled to one or more electrical loads 200a, 200b, . . . 200N (having index n=a, b, . . . , N). An alternating current AC is fed to the input 102 of the breaking circuit 100 and forwarded to the loads 200a, 200b, . . . 200N via the output 104 of the breaking circuit 100. The loads 200a, 200b, . . . 200N may therefore comprise household appliances and/or electrical heaters and/or other household electronics and/or essentially any other devices configured to be fed with alternating current AC.

The breaking circuit 100 may thus comprise an input 102 arranged to receive alternating current AC, and an output 104 arranged to provide the alternating current AC to at least one electrical load 200n, as mentioned above. The breaking circuit 100 further comprises at least one controllable switch 106, 108 coupled between the input 102 and the output 104. The at least one controllable switch 106, 108 may e.g. comprise one or more relay, thyristor, triac, gate turn off thyristor, transistor and/or any other type of controlled silicon rectifier or switch.

In the embodiments shown in FIG. 5, the breaking circuit 100 comprises two controllable switches, a first switch 106 and a second switch 108. The first switch 106 and the second switch 108 are coupled in series with each other and being arranged between the input 102 and the output 104. The first switch 106 and the second switch 108 may, according to an embodiment, be coupled in opposite directions between the input 102 and the output 104.

The first switch 106 and the second switch 108 may be, according to previously described embodiments, FETs which are serially coupled in opposite directions between the input 102 and the output 104. A FET can block the current in one direction, and hence the two FETs in this embodiment are coupled in opposite direction relative to the direction of the current. The FETs have a fast/short switching time (i.e. the time period for opening or closing the switch), which means that the current through the FETs can be broken very quickly when an overcurrent is detected, thereby limiting or eliminating potential damages to circuits and loads coupled to the output 104. The two FETs are, according to an embodiment, controlled by the same one or more controller 110, possibly by using a common gate voltage thereby simplifying the architecture.

The breaking circuit 100 may thus comprise a controller 110 arranged to control the at least one controllable switches 106, 108, so as to control the breaking of the current provided to the at least one electrical load 200n via the output 104. The controller 110 may be coupled to a reference ground $REF_{GND}$ common to the controller 110 and the at least one controllable switches 106, 108. The reference ground $REF_{GND}$ may then be used, and may then function, as a reference potential for measuring one or more voltage differences in the present breaking circuit 100. According to an embodiment, the reference ground $REF_{GND}$ is different from the ground for the at least one electrical load 200n. By having a reference ground different from the ground for the load 200n, smaller and cheaper electrical components can be used in the breaking circuit 100, since the mentioned electrical components do not have to be adapted to high voltages, such as AC mains voltages, e.g. 230 and 110 volts.

The controller 110 may, according to various embodiments, comprise a micro controller µC and/or a transistor network arranged to control the switching of the at least one controllable switches 106, 108. Hereby, the breaking of the alternating current AC provided to the at least one electrical load 200n is controlled.

The controller 110 may be a micro controller µC and may comprise at least one processor for managing the communication and controlling the at least one controllable switch and/or slave controllers. Moreover, it is realized by the skilled person that the controller may comprise other necessary capabilities in the form of e.g., functions, means, units, elements, etc., for performing the present solution. Especially, the processor or processors of the present controller may comprise, e.g., one or more instances of a Central Processing Unit (CPU), a processing unit, a processing circuit, a processor, an Application Specific Integrated Circuit (ASIC), a microprocessor, a micro controller or other processing logic that may interpret and execute instructions. The expression "processor" may thus represent a processing circuitry comprising a plurality of processing circuits, such as, e.g., any, some or all of the ones mentioned above, or another known processor. The processing circuitry may further perform data processing functions for inputting, outputting, and processing of data comprising data buffering and device control functions, such as call processing control, user interface control, or the like.

According to an embodiment, the controller 110 is arranged to monitor the power consumption pattern of the at least one electrical load 200n and to control the at least one controllable switch 106, 108 based on the monitored power consumption pattern of the at least one electrical load 200n. Thereby, the controller 110 may adapt the current fed to the load depending on thetype of the load, by for example shutting down the load for safety reasons or providing a higher or lower amount of power. Also, the controller may be arranged to control the at least one controllable switch 106, 108 such that breaking of the alternating current AC is effected if the power consumption pattern is irrational, i.e. if the power consumption pattern appears to be unexpected and/or disadvantageous, e.g. including transients, steps, or other sudden changes. Also, the controller may be further arranged to determine the type of the at least one load 200n based on the monitored power consumption pattern. Each type of load has its own power consumption pattern which can be identified. Hence, in this embodiment, the controller also has the capability to determine or identify the type of load, which means that the at least one controllable switch 106, 108 may be controlled based on the determined or identified type of load.

According to an embodiment, the breaking circuit 100 also comprises at least one driver circuit e.g. comprised in the controller 110. The at least one driver circuit is arranged to enhance and/or adjust control signals used by the controller 110 for controlling any of the switches in the breaking circuit 100 and/or power supply circuit 400. This may be needed e.g. when the control voltages and/or currents transmitted to the at least one controlled switch needs to be enhanced and/or adjusted (for example increasing or decreasing voltage and/or current). For example, the driver circuit may be arranged to be fed with 10-15 Volts and to deliver an increased voltage and/or current to the gate side of the FETs of the at least one controlled switch.

According to an embodiment, the breaking circuit 100 may be driven by a low power supply in order to work properly. This is possible since the at least one switch in the breaking circuit 100 and/or power supply circuit 400 may be implemented as a FET switch, e.g. a metal oxide semiconductor (MOS) FET switch or a Complementary metal oxide semiconductor (CMOS) FET switch, which needs very little current supply to perform the switching, e.g. in the region of micro amperes, for example less than 10 µA.

In the embodiments shown in FIG. 5, the power needed to drive the breaking circuit 100 is provided by the power supply circuit 400 which is arranged to provide a first parasite voltage $V_{par1}$ and/or a second parasite voltage $V_{par2}$ as a power supply to the breaking circuit 100. In FIG. 5, a first capacitor C1 and a second capacitor C2 of the power supply circuit 400 are arranged to provide a first parasite voltage $V_{par1}$ and/or a second parasite voltage $V_{par2}$ as a power supply to the controller 110 of the breaking circuit 100. As illustrated in FIG. 5, the power supply circuit 400 comprises a first switch 412, a second switch 414, a first rectifier 416 and a second rectifier 418, as well as the first capacitor C1 arranged between the first rectifier 416 and the second rectifier 418, and the reference ground $REF_{GND}$. The first capacitor C1 may generate a first parasite voltage $V_{par1}$ from the alternating current AC, as previously described with reference to FIG. 1a-c), and may provide the first parasite voltage $V_{par1}$ to the controller 110 of the breaking circuit 100. Furthermore, the input 102 is connected to the first capacitor C1 by the third rectifier 432 via a current limiter 434 arranged to limit the current being provided to the first capacitor C1. The output 104 is connected to the first capacitor C1 by the fourth rectifier 433 via the current limiter 434. The first capacitor C1 is further connected between the third rectifier 432 and the fourth rectifier 433, and the reference ground $REF_{GND}$. In addition, a second capacitor C2 is connected between the third rectifier 432 and the fourth rectifier 433, and the reference ground $REF_{GND}$. The first capacitor C1 and/or the second capacitor C2 may generate a second parasite voltage $V_{par2}$ from the alternating current AC, as previously described with reference to FIG. 2a-d), and provide the second parasite voltage $V_{par2}$ to the controller 110 of the breaking circuit 100

According to an embodiment, the power supply circuit 400 may further comprise one or more voltage regulators (not shown in FIGS. 4-5) arranged for regulating the voltage being provided to the breaking circuit 100 as a power supply. Such one or more voltage regulators may e.g. be arranged between the first capacitor C1 and the breaking circuit 100 and/or in the controller 110 or breaking circuit 100.

As described in this disclosure, since the parasite voltage $V_{par}$ is extracted/harvested from the alternating current AC in series with the one or more loads, the power supply circuit 400 will always be able to provide a power supply to the breaking circuit 100 when current is provided to the one or more active loads 200n. Also, when the one or more loads 200n are inactive, a leakage current $I_{leak}$ still runs to the protective ground and/or to a neutral line at the loads, which is enough for creating/generating/harvesting the parasite voltage $V_{par}$ needed for driving the breaking circuit 100. It should be noted that the leakage current $I_{leak}$ runs also if there are no loads 200n connected. As mentioned above, the breaking circuit 100 may be driven by a very low current. Thus, a reliable and useful parasite voltage $V_{par}$ will by the embodiments described in this document be provided as a power supply to the breaking circuit 100 during any condition, also when the one or more loads 200n do not consume power.

The breaking circuit 100 may initially be in the nonconducting/OFF mode, e.g. when first being installed. As previously described, the power supply circuit 400 may extract power that can be used to drive the breaking circuit 100 also when the breaking circuit 100 is in the nonconducting/OFF mode. Hence, the power supply circuit 400 starts to extract power when the breaking circuit 100 is installed and when enough power has been extracted, the breaking circuit 100 may be switched to the conducting/ON mode.

According to an embodiment of the present invention, the breaking circuit 100 as described for various embodiment in this document is further arranged to switch one or more switches of the breaking circuit 100 and/or the power supply circuit 400 to a non-conducting/OFF mode, i.e. open a switch, at every zero crossing for the alternating current AC. The alternating current AC normally has the form of a sinus signal, having positive and negative half periods. Between these half periods, i.e. in the transitions between the positive and negative half periods, the alternating current AC has a value of zero (0), which is herein denoted a zero crossing.

According to an embodiment, the breaking circuit 100 is arranged to determine a value of the parasite voltage $V_{par}$ provided to the power consumers of the breaking circuit 100, at or before, i.e. at the latest at, a zero-crossing for the alternating current AC. This value of the parasite voltage $V_{par}$ may then be used as a basis for switching of the one or more switches of the breaking circuit 100 and/or the power supply circuit 400, such that the at least one switch of the breaking circuit 100 and/or the power supply circuit 400 is kept in a non-conducting/OFF mode if the parasite voltage $V_{par}$ value is lower than a parasite voltage threshold value $V_{par\_th}$; i.e. $V_{par}<V_{par\_th}$. However, the at least one switch of the breaking circuit 100 and/or the power supply circuit 400 is switched to a conducting/ON mode if the parasite voltage $V_{par}$ value is higher than or equal to the parasite voltage threshold value $V_{par\_th}$; i.e. $V_{par} \geq V_{par\_th}$.

According to an embodiment, the breaking circuit 100 is arranged to determine a value of the parasite voltage $V_{par}$ provided to the controller 110 of the breaking circuit 100, at or before, i.e. at the latest at, a zero-crossing for the alternating current AC. The determined value of the parasite voltage $V_{par}$ may then be used as a basis for switching of the one or more switches of the breaking circuit 100 and/or the power supply circuit 400, such that the at least one switch of the breaking circuit 100 and/or the power supply circuit 400 stays in a non-conducting/OFF mode if the parasite voltage $V_{par}$ value is lower than or equal to a parasite voltage threshold value $V_{par\_th}$; i.e. $V_{par} \leq V_{par\_th}$. However, the one or more switches of the breaking circuit 100 and/or the power supply circuit 400 is switched to a conducting/ON mode if the parasite voltage $V_{par}$ value is then higher than the parasite voltage threshold value $V_{par\_th}$; i.e. $V_{par}>V_{par\_th}$.

It may for some implementations, such as e.g. for driving radiators or other electrical appliances as loads 200n, be advantageous to provide a number of whole periods of the alternating current AC to the output 104. This is, according to an embodiment of the invention, achieved by switching the at least one controllable switch 106, 108 to a conducting/ON mode at a zero crossing for the alternating current AC, and by switching the at least one controllable switch 106, 108 to a non-conducting/OFF mode at a zero crossing for the alternating current AC. Hereby, an integer number of whole periods of the alternating current AC is provided by the output 104, which mitigates potential problems regarding unbalanced circuits in the loads 200n and/or the power grid, since the effects of the positive and negative half periods of the alternating current are then cancelled out by each other.

It may for some implementations be advantageous to provide a number of half periods of the alternating current AC to the output 104. The breaking circuit 100 is therefore, according to an embodiment, arranged to provide one or more half time periods of the alternating current AC to at least one electrical load 200n by distributing the half periods equally between the positive and negative half periods by switching one or more of the at least one controllable switch 106, 108 to a conducting/ON mode at a zero crossing for the alternating current AC, and switching the at least one controllable switch 106, 108 to a non-conducting/OFF mode at a zero crossing for the alternating current AC. Since the positive and negative half periods are equally distributed, the effects of the positive and negative half periods of the alternating current are cancelled out by each other.

The present invention is not limited to the above described embodiments. Instead, the present invention relates to, and encompasses all different embodiments being included within the scope of the independent claims.

The invention claimed is:

1. A power supply circuit for a breaking circuit, the power supply circuit comprising:
 a first connecting point arranged to be connected to an input of the breaking circuit and a second connecting point arranged to be connected to an output of the breaking circuit;
 a first rectifier and a second rectifier connected in series and in opposite direction to each other between the first connecting point and the second connecting point;
 a first switch and a second switch connected in series between the first connecting point and the second connecting point, wherein the first switch and the second switch are connected in parallel to the first rectifier and the second rectifier;
 a third connecting point arranged to be connected between the input and the first switch of the breaking circuit and a fourth connecting point arranged to be connected between the output and the second switch of the breaking circuit;
 a first capacitor having a first connecting point connected between the first rectifier and the second rectifier and a second connecting point connected between the first switch and the second switch, wherein the first connecting point of the first capacitor is further arranged to be connected to a power consumer of the breaking circuit;
 a third rectifier and a fourth rectifier connected in series and in opposite direction to each other between the third connecting point and the fourth connecting point wherein the first connecting point of the first capacitor is connected between the third rectifier and the fourth rectifier;
 a second capacitor having a first connecting point connected between the third rectifier and the fourth rectifier, and having a second connecting point connected between the first switch and the second switch of the power supply circuit,
 wherein the power supply circuit is arranged to at least one of:
 open the first switch so that a current running from the input to the output passes via the first rectifier, the first capacitor and the second switch thereby charging the first capacitor; and
 open the second switch so that a current running from the output to the input passes via the second rectifier, the first capacitor and the first switch thereby charging the first capacitor.

2. The power supply circuit according to claim 1, arranged to at least one of:
 open the first switch and close the second switch so that the current running from the input to the output passes via the first rectifier, the first capacitor and the second switch thereby charging the first capacitor;
 close the first switch and open the second switch so that the current running from the output to the input passes via the second rectifier, the first capacitor and the first switch thereby charging the first capacitor.

3. The power supply circuit according to claim 1, wherein the first rectifier is a third switch and the second rectifier is a fourth switch, and arranged to at least one of: open the first switch and subsequently close the third switch so that the current running from the input to the output passes via the third switch, the first capacitor and the second switch thereby charging the first capacitor; and
 open the second switch and subsequently close the fourth switch so that the current running from the output to the input passes via the fourth switch, the first capacitor and the first switch thereby charging the first capacitor.

4. The power supply circuit according to claim 1, wherein the first rectifier is a first diode and the second rectifier is a second diode, and wherein the first diode is arranged in a direction towards the output and the second diode is arranged in a direction towards the input.

5. The power supply circuit according to claim 1, wherein the third rectifier is a fifth switch and the fourth rectifier is a sixth switch.

6. The power supply circuit according to claim 1, wherein the third rectifier is a third diode arranged in a direction towards the output and the fourth rectifier is a fourth diode arranged in a direction towards the input.

7. The power supply circuit according to claim 1, further comprising a current limiter connected between the third rectifier, the fourth rectifier and the first connecting point of the first capacitor.

8. The power supply circuit according to claim 1, wherein a ratio of a value of the first capacitor over a value of the second capacitor is larger than 100.

9. The power supply circuit according to claim 1, wherein at least one of the second connecting point of the first capacitor and the second connecting point of the second capacitor is connected to a reference ground of the breaking circuit.

10. A breaking circuit comprising a power supply circuit according to claim 1.

11. The breaking circuit according to claim 10, wherein the power consumer is a controller arranged to control at least one of the first switch and the second switch of the breaking circuit.

12. The breaking circuit according to claim 11, wherein the controller is further arranged to control the at least one of the first switch and the second switch of the power supply circuit.

13. The breaking circuit according to claim 10, wherein the power consumer is a communication device.

* * * * *